United States Patent
Rotz et al.

(10) Patent No.: US 7,222,867 B2
(45) Date of Patent: May 29, 2007

(54) AUTOMATED CONTROL SYSTEM FOR A VEHICLE LIFT AXLE

(75) Inventors: John F. Rotz, Fort Wayne, IN (US); David B. Brooks, Fort Wayne, IN (US); Joseph A. Bell, Markle, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 329 days.

(21) Appl. No.: 11/046,352

(22) Filed: Jan. 28, 2005

(65) Prior Publication Data

US 2006/0170168 A1 Aug. 3, 2006

(51) Int. Cl.
*B62D 61/12* (2006.01)
(52) U.S. Cl. .................... 280/86.5; 180/209
(58) Field of Classification Search ........... 280/86.5, 280/5.501, 124.16, 124.157, 5.514, 124.116; 180/24.02, 209; 701/37
See application file for complete search history.

(56) References Cited

U.S. PATENT DOCUMENTS

| 4,141,430 | A | * | 2/1979 | Eddy, Jr. ............. 180/24.02 |
| 4,854,409 | A | | 8/1989 | Hillebrand et al. |
| 6,240,339 | B1 | | 5/2001 | von Mayenburg et al. |
| 6,572,124 | B2 | | 6/2003 | Mlsna et al. |
| 6,810,982 | B2 | * | 11/2004 | Kuhn et al. ............. 180/209 |
| 2005/0127628 | A1 | * | 6/2005 | Ramsey ................ 280/86.5 |

* cited by examiner

*Primary Examiner*—Paul N. Dickson
*Assistant Examiner*—Robert A. Coker
(74) *Attorney, Agent, or Firm*—Jeffrey P. Calfa; Gerald W. Askew; Susan L. Lukasik

(57) ABSTRACT

An automated axle control system provides both indication to the driver when a lift axle should be raised or lowered, and takes action to effect axle positioning when the driver fails to respond. Operations are based on estimates of vehicle weight and vehicle speed and are implemented primarily through preexisting vehicle controllers and a controller area network over which the controllers communicate.

20 Claims, 4 Drawing Sheets

AUTOMATED CONTROL SYSTEM FOR A VEHICLE LIFT AXLE

BACKGROUND OF THE INVENTION

1. Technical Field

The invention relates to lift axles for load carrying utility vehicles and more particularly to a control system for such lift axles integrated with a comprehensive vehicle control system and providing substantial automation of the process.

2. Description of the Problem

Many utility vehicles are equipped with lift axles which may be raised under low load conditions to reduce vehicle rolling resistance and lowered to bring additional load bearing wheels into contact with a road under high load conditions to reduce per axle loading to within legal maximums. Obviously, a decision is required as to the appropriate times to raise and lower such a lift axle. The increasing sophistication of vehicle control systems has made much data available that might be used to indicate appropriate times for repositioning the lift axle. Issues relating to isolating this data and correlating the various sources of data for cooperative use have not previously been thoroughly addressed to the best knowledge of the present inventors.

Among the factors of interest in deciding whether to raise and lower and axle is the total vehicle load. This data can be isolated from air suspension pressure readings. Vehicle stability will be affected by changes in axle position, and thus an axle should not be repositioned if the vehicle is moving at more than a minimal rate of speed.

SUMMARY OF THE INVENTION

The present invention provides a positioning system for a lift axle for wheeled vehicles. The lift axle positioning system includes an air spring suspension system including a plurality of air springs for supporting a wheeled vehicle chassis from a plurality of axles including the lift axle. The air springs are inflated from an air spring inflation system including a pressurized, primary air tank. Load sensors communicate with each of the plurality of air springs to generate pressure measurement signals relating to the air springs. A primary air tank pressure sensor communicates with the primary air tank to provide a primary air tank pressure signal. A vehicle speed sensor provides a signal from which vehicle speed can be derived. A transmission controller reports transmission status. A park brake position sensor and an ignition switch are connected to a electrical system controller. The positioning system includes lift axle positioning pneumatic valves which are actuated by solenoid valve controllers. The electrical system controller connected to collect outputs of the several sensors, either directly or indirectly, and to issue instructions to the solenoid valve controllers.

The electrical system controller (ESC) is programmed to issue instructions to the solenoids which in turn control pneumatic control valves for positioning the lift axle. The ESC operates in response to the values of the load sensors, the primary air tank pressure sensor, the vehicle speed sensor, the transmission controller, the park brake position sensor and the ignition switch position sensor. The electrical system controller programming provides for filtering the load sensor signal to generate a load estimate. Primary air tank pressure is monitored to assure that the load sensor signals are accurate since the primary air tank is the source of inflation air for the load bearing air springs.

The electrical system controller programming provides to an operator distinct indications ("telltales") as to when the lift axle should be raised or lowered as a function of estimated vehicle weight. In addition, the lift axle and suspension pressure dump may be automatically controlled where the vehicle is above a threshold weight and threshold speed. The telltales light when it is recommended that an operator change the lift axle position and extinguish when the recommended action has taken place. The operator can raise the lift axle by a switch when the vehicle's weight is below a threshold value. The operator will be further able to raise and lower the lift axle when the vehicle's speed is less than 5 mph. The lift axle automatically lowers under control of the electrical system controller if the vehicle speed is greater than or equal to 5 mph and the vehicle weight exceeds the threshold. The operator is locked from manually raising the axle when weight is above the threshold for as long as vehicle speed exceeds 5 mph. The electrical system controller by default raises the lift axle if the parking brake is set.

The electrical system controller automatically dumps the suspension if the lift axle is raised by the operator and the vehicle's weight is greater than the threshold value.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
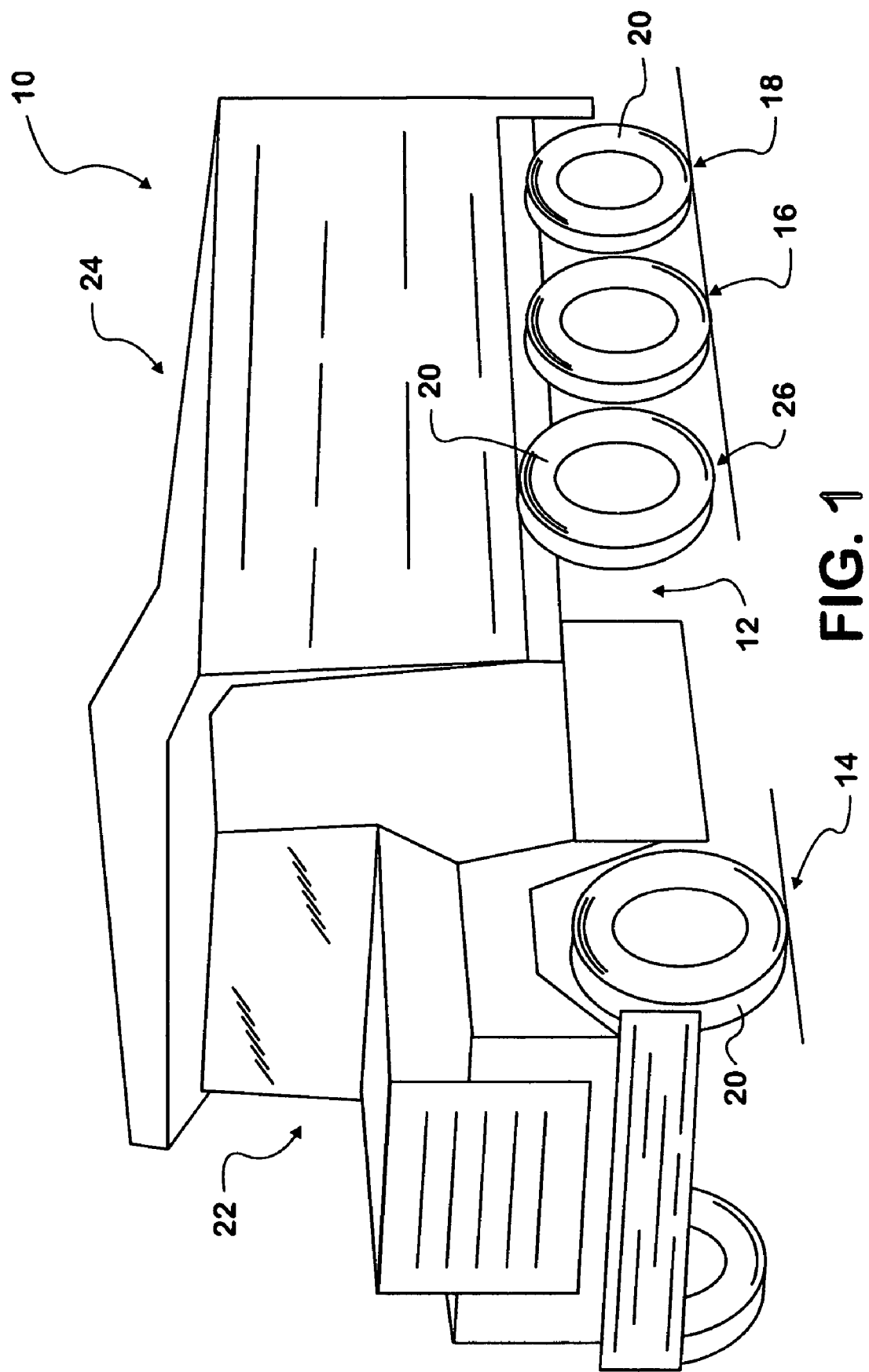
FIG. 1 is a perspective view of a truck equipped with a lift axle.

A vehicle 10 is shown in FIG. 1. Vehicle 10 can be any vehicle configured to haul large and varying loads. Vehicle 10 includes a chassis 12 with front and rear fixed axles 14, 16, 18, which in turn have wheels 20 mounted thereon to support chassis 12 above a road surface. Chassis 12 carries a body including a driver cab 22 and a cargo body 24, such as a dump body. Because the load carried by vehicle 10 varies greatly it can be advantageous to lower a supplementary axle to avoid having the vehicle violate per axle loading limitations. Here a lift axle 26 is provided as such a supplementary axle. Those skilled in the art understand that full time use of such an axle raises vehicle operating costs due to increased rolling resistance.

Figure 2:
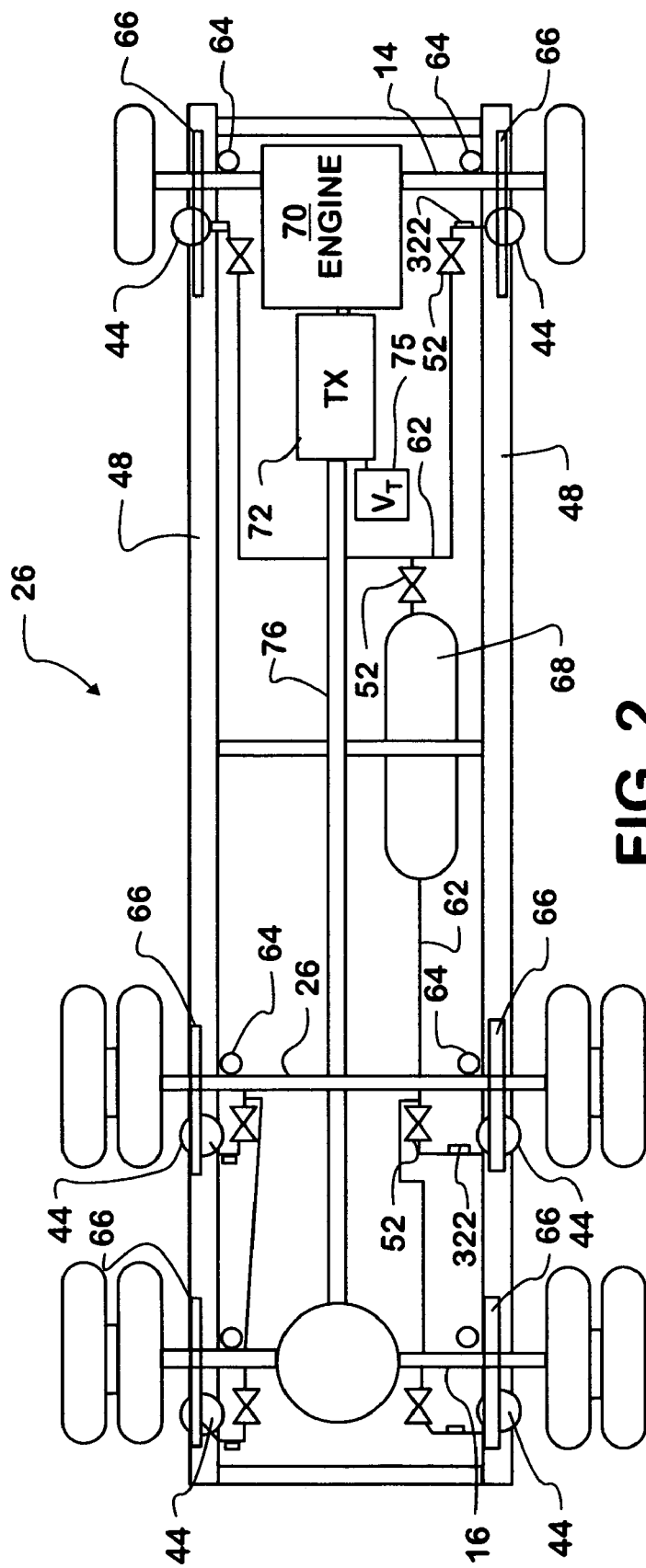
FIG. 2 is a top schematic view of a truck chassis.

Automatic operation of lift axle 26, or, alternatively, giving indication to an operator of appropriate times to raise or lower lift axle 26, involves other vehicle systems which are schematically illustrated in FIG. 2. Chassis 12 is equipped with an air suspension system in which air filled bladders (air springs 44) take over much if not all of the support and shock isolation functions of conventional solid springs. Among the advantages of air springs is that the quantity of air in them can be adjusted to maintain chassis 12 at a fixed height. To this end an air delivery system works through a height leveling valve 52. Air pressure in the air spring 44 is thus correlated with vehicle load. A pressure sensor 322 is provided for each air spring 44 circuit and provides the basic data for the determination of axle load. Typically there will only one such circuit per vehicle, however, other arrangements are possible, including individual control for each air spring and intermediate arrangements, such as the two circuit design illustrated in the figure. Additional suspension stabilizing linkages 66 are associated with each air spring 44 depending from frame side rails 48. Air lines 62 connect to a compressed air tank 68 installed on chassis 12 between side frame rails 48. An engine 70 provides motive power for chassis 12, driving a propeller shaft 76 by an automatic or semi-automatic transmission 72. Propeller shaft 76 is connected between the transmission 72 and a differential 74 for the single drive axle 16 shown. A tachometer 75 is coupled to propeller shaft 76 and allows the determination of the average rotational velocity of the drive wheels from which vehicle speed is estimated. Lift axle 26 is not driven. Pneumatic positioning cylinders 64 are mounted between chassis 12 and lift axle 26 to raise or lower the lift axle as required by the vehicle electronic control system, described below.

Figure 3:
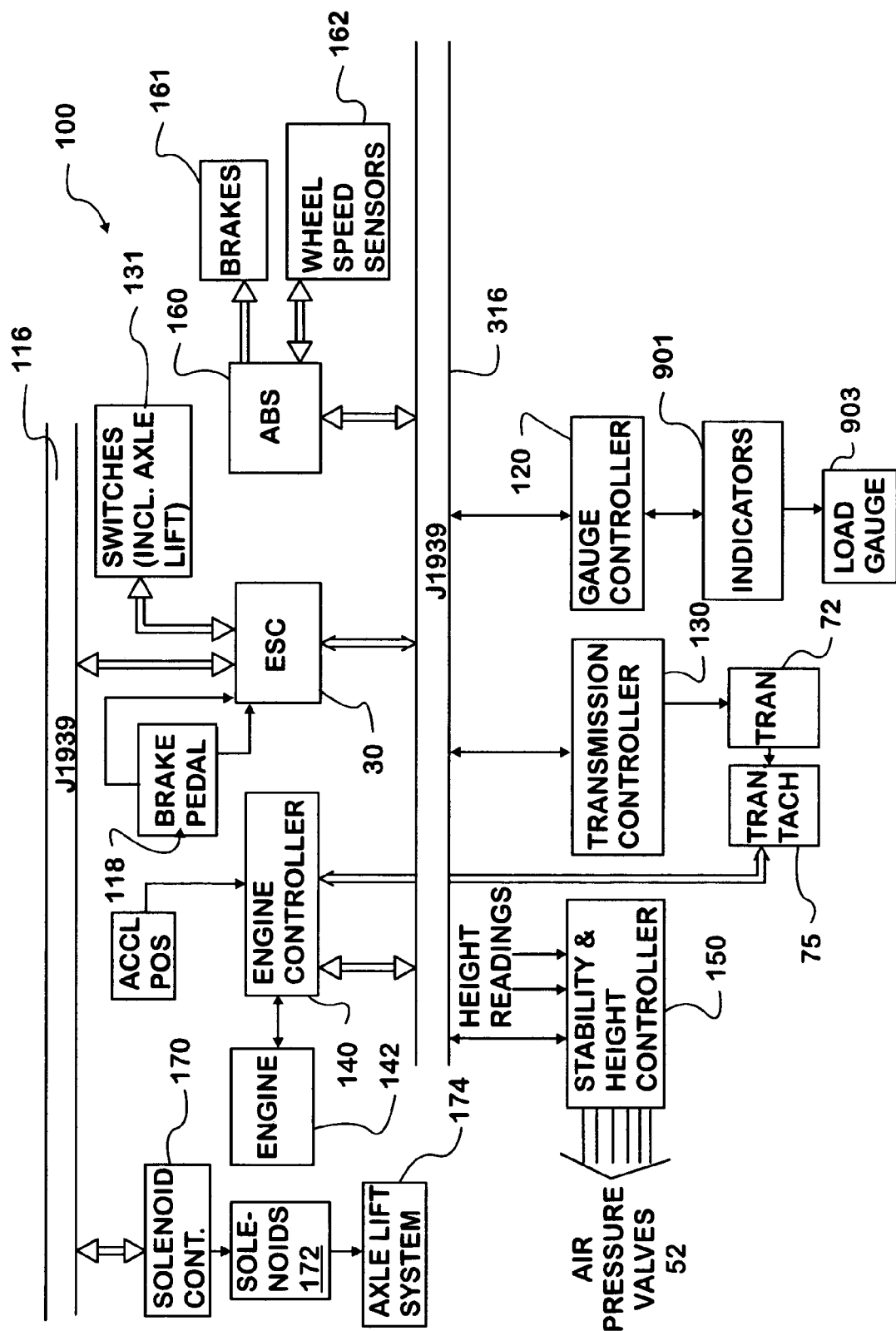
FIG. 3 is a schematic view of a vehicle electrical control system.

With reference to FIG. 3, a vehicle electronic control system 100 for vehicle 10 and chassis 12 is schematically illustrated. Vehicle electronic control system 100 is a generalization of applications of contemporary digital networks to motor vehicles, and may advantageously based on the Society of Automotive Engineers SAE J1939 standard for controller area networks. An SAE J1939 compliant bus 316 interconnects a plurality of controllers provided for primary vehicle functions. Among these controllers are an engine controller 140, an anti-lock brake system controller 160, a gauge controller 120, a transmission controller 130 (for automatic and semi-automatic equipped vehicles), an electronic system controller (ESC) 30 and, potentially, a stability and height (suspension) controller 150.

ESC 30, unlike most of the other modules, is not concerned strictly with the function of a particular system or subset of devices, but monitors all of the other controllers and can be used to implement algorithms directed to optimizing vehicle operation. ESC 30 may also be assigned direct control of a subset of vehicle functions and direct responsibility for monitoring other vehicle functions. ESC 30 is attached to monitor a park brake 118, a load sensor 268 (i.e. pressure sensor(s) 322, where not connected directly to a stability and height controller 150), a primary tank 68 pressure sensor 168 and ignition switch 166. In addition, ESC 30 is connected to an SAE J1708 bus over which it communicates with a group of switches 131 which in turn include control switches for positioning the lift axle 26. ABS 160 can report on the operation of brakes 161 and, if desired, can report vehicle speed from the wheel speed sensors 162. Typically, vehicle speed is provided by a transmission tachometer 75 which communicates with engine controller 140. ESC 30 acts as a gateway between the public J1939 bus 316 and a proprietary J1939 bus 116. Automatic control of the lift axle is implemented by programming of ESC 30. The instructions generated by ESC 30 are coded as J1939 messages and broadcast over private bus 116. The instructions are decoded from the J1939 messages carried out by a solenoid controller 170 connected to the private J1939 bus 116. Solenoid controller 170 generates the actual control signals applied to solenoids 172. Gauge controller 120 generates indication or telltales on indicator lights 901.

Engine controller 140 manages operation of an internal combustion engine 70. Engine controller generates an estimate of instantaneous engine torque from fuel flow, engine rpms and appropriate preprogrammed look up tables. Engine torque is then made available on the bus 316. The engine controller 140 is also connected to accelerator position sensor 121 and provides messages over bus 316. Transmission tachometer 75 generates a vehicle speed estimate based on the average rotational speeds of the drive wheels of tractor 26 from a transmission output shaft. Gauge controller 120 typically handles a standard instrument package. A transmission controller 130 controls transmission 72 and is operated to dynamically select start gears, to modify shift points and to select a running gear of transmission 72 based on vehicle weight (if available), speed and engine torque.

Vehicles may in the future be equipped with a height and stability controller 150 which will adjust vehicle height and individual air spring pressurization to counter the effects of persistent cross winds, cornering, indication of excessive vehicle roll, etc. as indicated by axle load determination. The stability and height controller 150 could then operate on inputs relating to vehicle height and perhaps on differential wheel speed information supplied by ABS 160 to control air pressure valves 52 for air springs located along the sides of the vehicle. The functions implemented by a height and stability controller 150, as well as transient charges in loading of a given air spring 44 from road shock, complicate isolation of a vehicle load value from the raw air spring pressure measurement.

If transmitted over the J1939 bus 316, vehicle load measurements are formatted as signals by scaling the measurement to be proportioned to the load range which is of interest to the operator. The information is then formatted for transmittal over the SEA J 1939 bus 316. The signal is picked up by gauge controller 120 for display to the operator and may be picked up by transmission controller 130 to be used as an argument in interrogating a gear choice look up table. ESC 30 collates the various data to determine when a lift axle should be raised or lowered, whether conditions permit doing so, and carrying out the operation in the absence of indication from the operator as to what to do with respect to positioning the lift axle.

The several controllers are data processing units implemented using conventional microprocessor and memory technology. They are programmable and have access to stored look up tables which may be loaded with empirically collected data.

Figure 4:
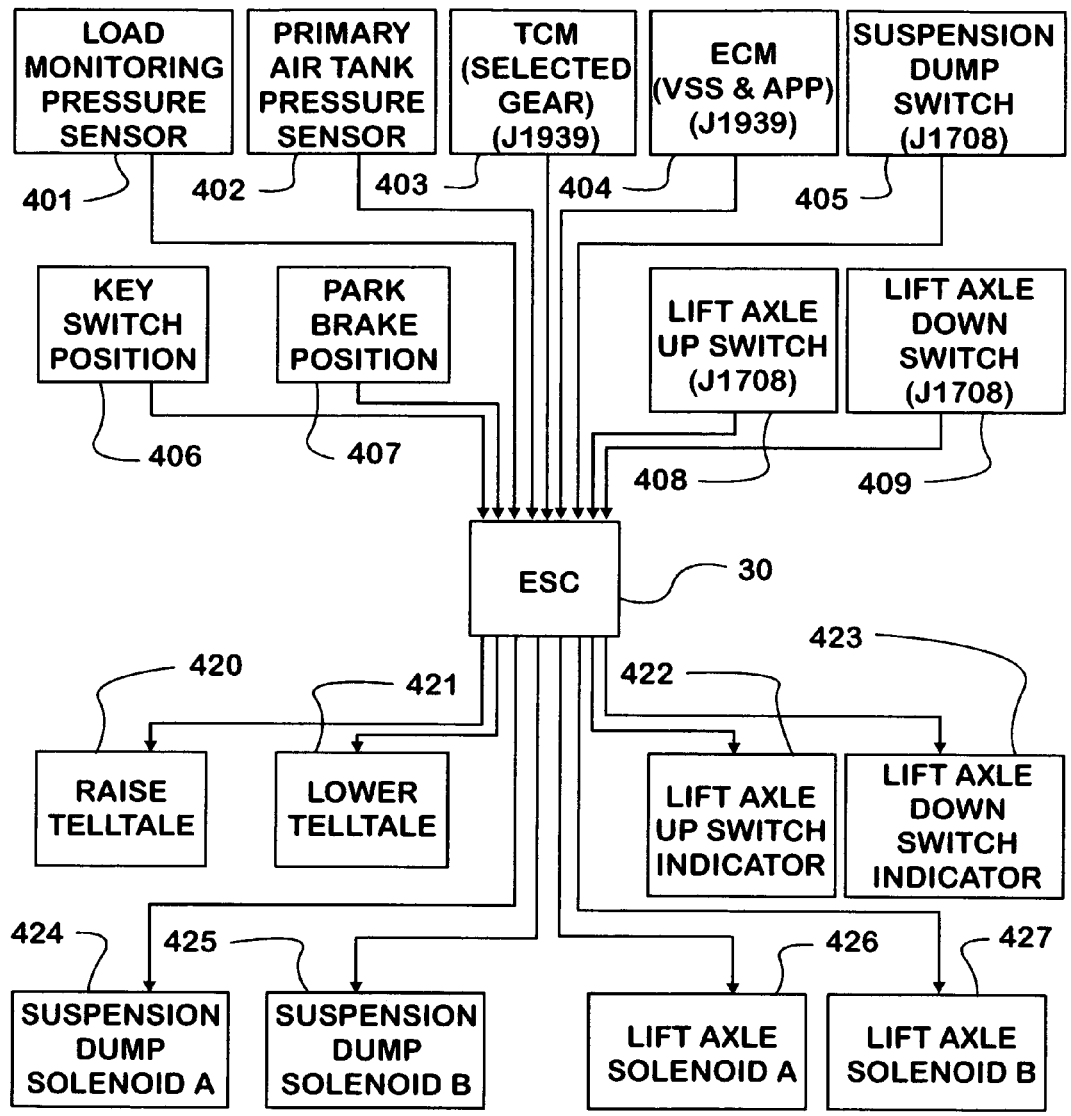
FIG. 4 is a schematic illustration of signals received and generated by an electrical system controller.

FIG. 4 summarizes the signals received by ESC 30 and the outputs generated by ESC 30. Selected gear signals 403 from the transmission controller 130 and vehicle speed (VSS) and accelerator position (APP) from the engine control module 140 are J1939 messages. The suspension dump switch position signal 405, lift axle up signal 408 and lift axle down signal 409 are received over the J1708 bus. The load monitoring pressure signal 401, primary air tank pressure signal 402, ignition switch position 406 and park brake position 407 are all applied directly to ESC 30.

Outputs include raise and lower telltale signals 420, 421 and the lift axle up and lift axle down indicator signals 422, 423, all for the gauge controller 120. Suspension dump signals 424 and 425 and lift axle signals A and B 426, 427 are provided over the private J1939 bus 116 to solenoid controller 170 from ESC 30.

The signal sourced by load monitor pressure sensor 268 must be filtered to remove unwanted signal variation such as that due to vehicle movement. To filter this signal, a 2-point weighted average filter is used. The filtering formula finds the filtered load monitor pressure signal ($L_F$) from the current load pressure sensor signal reading ($P_L$) from the previously calculated filtered load monitor pressure signal ($L_{OLD}$). K is an arbitrary whole number parameter.

$$L_F = 1/256 * P_L + 255/256 * L_{OLD} \text{ or, put generally,}$$

$$L_F = 1/K * P_L + (1-K)/K * L_{OLD}.$$

However, If the load monitor pressure sensor has a bad status, then:

$$L_F = L_{OLD}.$$

The load determination is used to determine axle load. Part of this calculation depends upon use of an error offset, which is provided as a programmable parameter. A second parameter "slope" is also used as illustrated below. Slope is initially set at 255 lbs/psig and the Offset at 1400 lbs. These values may be adjusted based on vehicle testing. The Calculated Axle Load ($L_A$) is an estimation of the vehicle weight carried on an axle based upon the pressure in the primary air suspension.

$$L_A = \text{Slope} * L_F + \text{Offset} + \text{Error Factor}.$$

Determination of whether or not the primary air tank is supplying air is based on a set of rules. The first rule states that if the primary tank pressure signal is below and has not yet reached 95 psig following cycling of key switch 166 from off to any other state, a module reset, or a reset following pressure falling below a minimum operating value, a false signal indicating primary tank 68 is not supplying air is generated. The second rule states that once the air pressure has reached 95 psig, the signal is true. The third rule provides that after the air pressure signal reaches 95 psig, should the pressure at any time fall below 75 psig, the signal is false and the process is returned to rule 1. The 95 psig represents the minimum pressure (i.e. worst case) required to guarantee that a pressure protection valve is open. The pressure protection valve controls when the suspension is receiving air pressure from the primary air tank. The 75 psig is the maximum pressure (i.e. worst case) at which the pressure protection valve will close.

A stop cycle may be broadly defined as the time the vehicle spends between stops. ESC 30 determines the vehicle weight once per stop cycle. ESC 30 is programmed to implement a series of logical tests to determine when stop cycles begin and end. A new stop cycle begins when:
the vehicle is not currently in a stop cycle; AND
((the transmission is not in neutral, AND
the transmission has a good status, AND
the accelerator pedal position is greater than 0%, AND
the accelerator pedal position has a good status, AND
first time accelerator pedal position exceeds 0% since the transmission has left neutral), OR
(the vehicle exceeds 3 kph after having remained below 3 kph for three continuous minutes, AND vehicle speed has a good status, AND
vehicle speed has been good for three continuous minutes, AND
the transmission is not in neutral, AND
the transmission has good status.))
If the accelerator pedal position is greater than 0% when the transmission leaves neutral, it is deemed to be the first such occurrence and to therefore meet the above criteria.
A stop cycle ends when:
(the transmission is in neutral, AND
the transmission has a good status, AND
the vehicle speed is less than 3 kph, AND
the vehicle speed has a good status), OR
(the transmission has a bad status, AND
the vehicle speed is less than 3 kph, AND
the vehicle speed has a good status), OR
(the vehicle remains below 3 kph for three continuous minutes after the vehicle is in a stop cycle, AND the vehicle speed has a good status, AND
the transmission is not in neutral, AND
the transmission has a good status), OR
the vehicle speed message has a bad status.

ESC 30 sets the stop cycle weight to unknown at the start of every new stop cycle. If the stop cycle weight is unknown during a stop cycle, then the ESC will set the stop cycle weight after the following is true:
the primary air tank is supplying air; AND
the primary air tank pressure has a good status; AND
filtered load monitor pressure signal exceeds 8 psig; AND
change in filtered load monitor pressure signal is less than 3 psig for more than 10 seconds; AND
the filtered load monitor pressure sensor has a good status; AND
vehicle speed has varied by less than 1.5 mph in last 10 sec.; AND
the vehicle speed has a good status; AND
the lift axle solenoids have not changed states (to up or to down) in the past 30 seconds.

The immediately preceding rule set may be satisfied for meeting the 10 second time limits by including the 10 seconds before a new stop cycle starts. The 30 second time limit may similarly include the 30 seconds before a new stop cycle starts. 8 psig is the maximum pressure that may be measured when the suspension is dumped. The measurement of change in air pressure as monitored by the filtered load monitor pressure sensor is to assure stability in the mechanical air system. Changes in vehicle speed influence vehicle stability and consequently affect weight (i.e. load) measurements. Measurements are limited to periods when the vehicle has not undergone substantial acceleration or deceleration (and that therefore stability has not been influenced by vehicle acceleration and deceleration). The 30 second time frame for lift axle movement is to ensure that the system does not detect false stability due to lift axle movement in combination with the air line plumbing. 3 psig and 10 second time frame are used for example only and figures for a specific vehicle may change based upon vehicle testing. Similarly the 1.5 mph window and 10 second time frame may change based upon vehicle testing. The 30 second time frame may change based upon vehicle testing.

To set the stop cycle weight during a stop cycle, the ESC will do the following:
If the lift axle is commanded up;
Then the ESC will set the stop cycle weight to the current calculated axle load;
If the lift axle is commanded down or if the state of the lift axle is unknown;
Then the ESC will set the stop cycle weight to the current calculated axle load plus the following offset:
If load monitor pressure sensor is less than 36 psig, the offset is: (load monitor pressure sensor*262)+2800 lbs;
If load monitor pressure sensor is greater than or equal to 36 psig, the offset is 12232 lbs.

The 36 psig value is the maximum air pressure allowed in the load bags of the lift axle due to a regulator in the air line plumbing between the primary air suspension and the load bags of the lift axle. The calculated axle load is used so that the vehicle weight changes only once per stop cycle.

ESC 30 verifies that the stop cycle weight has not changed due to vehicle conditions once the stop cycle weight is set during a stop cycle. ESC 30 sets the stop cycle verification weight to 0 lbs at the start of every new stop cycle. If the stop cycle weight is known during a stop cycle and the stop cycle verification weight is 0 lbs, then the ESC will set the stop cycle verification weight to unknown after the following are not true:

the primary air tank is supplying air; AND
the primary air tank pressure has a good status; AND
the filtered load monitor pressure sensor exceeds 8 psig; AND
the change in filtered load monitor pressure sensor is less than 3 psig for more than 10 seconds; AND
the filtered load monitor pressure sensor has a good status; AND
the delta change in vehicle speed is less than 1.5 mph for more than 10 seconds AND the vehicle speed has a good status; AND
the lift axle solenoids have not changed states (to up or to down) in the past 30 seconds.

The 10 second time limits may include the 10 seconds before a new stop cycle starts. The 30 second time limit may include the 30 seconds before a new stop cycle starts. The 8 psig is the maximum pressure that may be measured when the suspension is dumped. The measurement of change in air pressure as monitored by the filtered load monitor pressure sensor determines stability in the mechanical air system. As before, vehicle speed measurements are to determine that the vehicle is not accelerating or decelerating (and that therefor stability that is not influenced by vehicle acceleration/deceleration). The 30 second time frame for lift axle movement is to ensure that the system does not detect false stability due to lift axle movement in combination with the air line plumbing. Also as before, the 3 psig and 10 second time frame may change based upon vehicle testing. The 1.5 mph and 10 second time frame may change based upon vehicle testing. The 30 second time frame may change based upon vehicle testing.

If the stop cycle verification weight is zero during a stop cycle, then the ESC will set the stop cycle verification weight after the following is true:

the primary air tank is supplying air; AND
the primary air tank pressure has a good status; AND
the filtered load monitor pressure sensor is greater than 8 psig; AND
the change in filtered load monitor pressure sensor is less than 3 psig for more than 10 seconds; AND
the filtered load monitor pressure sensor has a good status; AND
the change in vehicle speed is less than 1.5 mph for more than 10 seconds; AND
the vehicle speed has a good status; AND
the lift axle solenoids have not changed states (to up or to down) in the past 30 seconds.

As before the time and acceleration/deceleration limits are subject to change.

To set the stop cycle verification weight during a stop cycle, ESC 30 executes a program to implement the following rule:

If the lift axle is commanded up,
Then the ESC will set the stop cycle verification weight to the current calculated axle load; OR
If the lift axle is commanded down or if the state of the lift axle is unknown,
Then the ESC will set the stop cycle verification weight to the current calculated axle load plus one of the following offsets,
(If load monitor pressure sensor is less than 36 psig, then the Offset is: (load monitor pressure sensor*262)+2800 lbs, OR
If load monitor pressure sensor is greater than or equal to 36 psig, then the Offset is 12232 lbs.)
The 36 psig value is the maximum air pressure allowed in the load bags of the lift axle due to a regulator in the air line plumbing between the primary air suspension and the load bags of the lift axle. If the stop cycle weight is known and the stop cycle verification weight is known during a stop cycle, then if the verification weight is greater than the stop cycle weight by more than 2000 pounds, then the stop cycle weight is set to the verification weight, then the verification weight is reset to zero and the verification weight determination algorithm is restarted.

ESC 30 broadcasts a J1939 message to request EGC 120 to turn on the "Lower Axle" light when:

the key switch is not in the off position; AND
(there is a pressure sensor fault, OR
(the park brake is not set, AND
the primary air suspension is not dumped, AND
((stop cycle weight is not unknown, AND
stop cycle weight is greater than 18001 lbs), OR
(the stop cycle weight is unknown, AND
the lift axle solenoids have not changed states (to up or to down) in the past 30 seconds)); AND
(the lift axle is commanded up, OR
both lift axle solenoids are de-energized because of initialization requirements))).

The weight threshold may change based upon vehicle testing. It is assumed that the lower light will only work with the key switch in the run or crank position.

ESC 30 requests that EGC 120 turns on the "Raise Axle" light by means of a J1939 message when:

the key switch is not in the off position; AND
(there is a pressure sensor fault, OR
(the primary air suspension is not dumped, AND
stop cycle weight is not unknown, AND
stop cycle weight is less than 18000 lbs), AND
(the lift axle is commanded down, OR
both lift axle solenoids are de-energized because of initialization requirements)).

It is assumed that the raise light will only work with the key switch in the run or crank position.

An operator request for axle lift is only valid when the key is in the run or the accessory position. The operator request for the lift axle to lower operates in response to:

the lift axle down switch transitions from the lower position to the upper position; AND
the lift axle up switch is in the lower position; AND
the lift axle down switch has a good status; AND
the lift axle up switch has a good status.

An operator request for the lift axle to be raised operates in response to:

the lift axle up switch transitions from the lower position to the upper position; AND
the lift axle down switch is in the lower position; AND
the lift axle up switch has a good status; AND
the lift axle down switch has a good status.

If one switch is in the upper position, and then the other switch transitions to the upper position, no new operator request is granted until after both switches return to the lower position. ESC 30 passes J1939 messages over private J1939 bus 116 to solenoid controller 170 which in turn directs two air solenoids 172 to raise and lower the lift axle. The two solenoids will be normally open air solenoids connected to a latching valve. The two air solenoids 172, under normal operation with the key not in the off position, are set to opposite states except for the instance described with respect to initialization. With the key in the off position, the two air solenoids will both be de-energized, except for the case where ESC 30 causes the solenoids to raise the lift axle. If the first of the solenoids is de-energized and when the second solenoid is energized, the latching valve supplies air and the lift axle is raised. If the first solenoid is energized and the second solenoid de-energized, the latching valve supplies no air and the lift axle is lowered.

The ESC 30 causes the solenoids to lower the lift axle when:
the key switch is not in the off position; AND
the suspension is not dumped; AND
((the operator requests the lift axle to lower, AND
the park brake is not set, AND
(((vehicle speed is less than or equal to 5 mph, AND
vehicle speed has a good status), OR
vehicle speed has a bad status), OR
(vehicle speed is greater than or equal to 10 mph, AND
vehicle speed has a good status, AND
stop cycle weight is not unknown, AND
stop cycle weight is greater than 18001 lbs)) OR
(vehicle speed is greater than 5 mph, AND
vehicle speed is less than 10 mph, AND
vehicle speed has a good status, AND
((stop cycle weight is not unknown, AND
stop cycle weight is greater than 18001 lbs), OR
the load monitoring pressure sensor has a bad status)), OR
(vehicle speed has a bad status, AND
the park brake transitions to not set, AND
(((stop cycle weight is not unknown, AND
stop cycle weight is greater than 18001 lbs), OR
top cycle weight is unknown), OR
the load monitoring pressure sensor has a bad status)), OR
(vehicle speed is greater than 5 mph, AND
vehicle speed is less than 10 mph, AND
vehicle speed has a good status, AND
stop cycle weight is unknown))).

The determination "suspension is not dumped" is included in the logic to make sure there is air in the primary axle suspension so the system can estimate axle load. In the common implementation, the load bags of the lift axle draw air from the primary axle suspension.

The ESC causes the solenoids to raise the lift axle when:
(the key switch is not in the off position, AND
the operator requests the lift axle to raise, AND
((vehicle speed is less than or equal to 8 kph, AND
vehicle speed has a good status), OR
((stop cycle weight is not unknown, AND
stop cycle weight is less than 18000 lbs), AND
the load monitoring pressure sensor has a good status))); OR
(the key switch is not in the off position, AND
park brake transitions to set, AND
(the vehicle speed is less than 3 kph, OR
the vehicle speed has a bad status)); OR
(the key switch transitions to the off position, AND
(vehicle speed is less than 3 kph, OR
the vehicle speed has a bad status)).

If the air solenoid power is on when the key switch transitions to off, ESC 30 keeps the air solenoid power active for 3 seconds after the key switch is turned off to ensure that the latching solenoid is capable of being switched to raise the lift axle. If the air solenoid power is off when the key switch transitions to off, ESC 30 will keep the air solenoid power off. The key transitions to the off position were added in the case that the park brake not set until after the vehicle is turned off and ESC 30 has gone into sleep mode. The terms for park brake transition and key switch transition may be removed based upon vehicle testing.

Lift Axle Down Switch Indicator operation is now described. Here it is assumed that the switch indicator will only work with the key switch in the run or accessory position. The lift axle down switch indicator will be on when:
ESC 30 has causes the air solenoids to lower the lift axle; AND
the criteria for the lift axle down switch indicator to flash fast have not been met.

The lift axle down switch indicator will flash slow when:
the lift axle down switch is in the upper position; AND
the criteria for the lift axle down switch indicator to be on have not been met; AND
the criteria for the lift axle down switch indicator to flash fast has not been met.

The lift axle down switch indicator will continue to flash slowly for 5 seconds when the down switch has returned to the lower position. The 5 seconds of flash slow will happen even if the indicator state would change when the switch has returned to the lower position. The lift axle down switch indicator will flash fast when:
the first of lift axle air solenoid has a bad status; OR
the second lift axle air solenoid has a bad status; OR
communication with the air solenoid 7 pack has been lost; OR
the lift axle down switch has a bad status.

The switch is not allowed to remain in the upper or lower position for greater than 0.5 seconds without the system indicating a bad state and the switch as having a bad status. The lift axle down switch indicator will continue to flash fast for 5 seconds if the reason for fast flash was a bad switch status and the switch status becomes good. The 5 seconds of flash fast will happen even if the indicator state would change when the switch status becomes good.

The lift axle down switch indicator is off when:
the criteria for the lift axle down switch indicator to be on has not been met; AND
the criteria for the lift axle down switch indicator to flash slow has not been met; AND
the criteria for the lift axle down switch indicator to flash fast has not been met.

Lift Axle Up Switch Indicator operation is now considered. Here it is assumed that the switch indicator will only work with the key switch in the run or accessory position. The lift axle up switch indicator will be on when:
ESC 30 has directed the solenoid controller 170 to actuate the solenoids 172 to raise the lift axle; AND
the criteria for the lift axle up switch indicator to flash fast have not been met.

The lift axle up switch indicator will flash slow when:
the lift axle up switch is in the upper position; AND
the criteria for the lift axle up switch indicator to be on has not been met; AND
the criteria for the lift axle up switch indicator to flash fast has not been met.

The lift axle up switch indicator will continue to flash slow for 5 seconds when the up switch has returned to the lower position. The 5 seconds of flash slow will happen even if the indicator state would change when the switch has returned to the lower position.

The lift axle up switch indicator will flash fast when:
lift axle air solenoid A has a bad status; OR
lift axle air solenoid B has a bad status; OR
communication with the air solenoid 7 pack has been lost; OR
the lift axle up switch has a bad status.

The switch must remain not in the upper or lower position for longer than 0.5 seconds for the system to consider this a bad state and therefor consider the switch to have a bad status. The lift axle up switch indicator will continue to flash fast for 5 seconds if the reason for fast flash was a bad switch status and the switch status becomes good. The 5 seconds of flash fast will happen even if the indicator state would change when the switch status becomes good.

The lift axle up switch indicator will be off when:

criteria for the lift axle up indicator to be on have not been met; AND the criteria for the lift axle up switch indicator to flash fast have not been met; AND the criteria for the lift axle up switch indicator to flash slow has not been met.

Suspension dump instructions are generated by ESC 30 and can be passed to either the solenoid controller 170 or, alternatively, to Suspension (or Stability and) Height Control 150. In so far as suspension dumps concern the present invention the process is now described. ESC 30 instructs solenoid controller 170 or SHC 150 to dump the suspension 52 when:

the ESC has just controlled (new) the lift axle to raise; AND ((the stop cycle weight is not unknown, AND stop cycle weight is greater than 18000 lbs), OR the stop cycle weight is unknown, OR the load monitoring pressure sensor has a bad status).

The stop cycle weight is greater than 18000 lbs refers to before the axle is raised. If the suspension is dumped in this manner, the suspension shall raise based upon the suspension dump switch being cycled to the suspension position. If the suspension is dumped for any reason, the suspension shall raise if the vehicle speed exceeds 5 mph. The suspension shall be able to raise if there is a wheel based vehicle speed error or out of range condition.

Initialization Requirements are now described. When the key switch transitions from the off position to the run or accessory position, initialization occurs. Otherwise, initialization fails. ESC 30 may not always be able to differentiate the off key position from other key positions when a low voltage condition occurs. Thus the vehicle is not in a stop cycle at initialization. At initialization the lift axle is to be considered to not have transitioned in the past 30 seconds. All criteria that require something to have happened in a 10 second time frame may exclude the 10 seconds prior to initialization. The calculated axle load and the filtered load monitor pressure sensor shall be initialized to zero when the load monitor pressure sensor has a good status at the time of initialization. ESC 30 may or may not store the last known position of the lift axle upon vehicle start. Where ESC 30 stores the last state of the lift axle, the ESC causes control signals to be generated for application to air solenoids 172 to effect the proper energized/de-energized state for the known position. If ESC 30 does not know the state of the lift axle, the ESC will leave both lift axle solenoids de-energized until operator actions would result in controlling the solenoids to the raised or lowered position. All of the requirements for raising or lowering the axle still apply. Both lift axle switch indicators flash slowly until operator actions would result in controlling the solenoids to the raised or lowered position.

The invention provides an automated lift axle control system which accounts for vehicle loading and stability in determining when to raise and lower and axle.

While the invention is shown in only one of its forms, it is not thus limited but is susceptible to various changes and modifications without departing from the spirit and scope of the invention.

What is claimed is:

1. A positioning system for a lift axle for wheeled vehicles, the positioning system comprising:

an air spring suspension system including a plurality of air springs for supporting a wheeled vehicle chassis from a plurality of axles including the lift axle;

an air spring inflation system including a primary air tank;

load sensors communicating with the plurality of air springs;

a vehicle speed sensor;

a transmission controller for reporting a selected transmission gear;

an accelerator pedal position sensor;

a park brake position sensor;

a primary air tank pressure sensor communicating with the primary air tank;

an ignition switch position sensor;

lift axle positioning means;

an electrical system controller connected to collect outputs of the load sensors, the vehicle speed sensor, the accelerator pedal position sensor, the transmission controller the primary air tank pressure sensor, the park brake position sensor and the ignition switch position sensor; and the electrical system controller being programmed to issue instructions to the lift axle means responsive to the values of the load sensors, the vehicle speed sensor, the transmission controller, the park brake position sensor and the ignition switch position sensor.

2. A positioning system for a lift axle for wheeled vehicles as set forth in claim 1, the programming of the electrical system controller further comprising:

means for validating the load signals as potentially valid responsive to values received for the primary air tank pressure signal.

3. A positioning system for a lift axle for wheeled vehicles as set forth in claim 2, further comprising:

means for issuing telltales to an operator as to when the lift axle should be raised and lowered.

4. A positioning system for a lift axle for wheeled vehicles as set forth in claim 3, the programming of the electrical system controller further comprising:

means for implementing a lift axle and suspension pressure dump where the vehicle is above a threshold weight and threshold speed.

5. A positioning system for a lift axle for wheeled vehicles as set forth in claim 4, the programming of the electrical system controller further comprising:

a switch coupled for communication with the electrical system controller by which the operator can raise the lift axle when vehicle weight is below a threshold value.

6. A positioning system for a lift axle for wheeled vehicles as set forth in claim 5, the programming of the electrical system controller further comprising:

means for automatically lowering the lift axle if the vehicle speed is greater than or equal to 5 mph, the vehicle weight exceeds the threshold and the operator has not manually lowered the lift axle.

7. A positioning system for a lift axle for wheeled vehicles as set forth in claim 6, the programming of the electrical system controller further comprising:

means for locking out the operator from manually raising the axle when weight of the wheeled vehicle is above the threshold for as long as vehicle speed exceeds 5 mph.

8. A positioning system for a lift axle for wheeled vehicles as set forth in claim 7, the programming of the electrical system controller further comprising:
   means for raising the lift axle automatically responsive to setting of the park brake.

9. A wheeled vehicle comprising:
   a plurality of axles including a lift axle;
   means for raising and lowering the lift axle;
   an electrical system controller and at least a first controller area network including the electrical system controller as a node;
   a suspension system including air springs for supporting a sprung portion of the vehicle from the plurality of lift axles;
   an air spring inflation system including a primary air tank connected to supply pressurized air to the air springs;
   load sensor communicating with each of the plurality of air springs to generate pressure measurement signals relating to the plurality of air springs and connected for communicating the load signals to the electrical system controller;
   a primary air tank pressure sensor communicating with the primary air tank to provide a primary air tank pressure signal and coupled to the electrical system controller for providing a primary air tank pressure signal;
   a vehicle speed sensor which provides a vehicle speed related signal over said at least first controller area network;
   a transmission controller connected to said at least first controller area network for reporting the current selected transmission gear and a status value for a vehicle transmission;
   an accelerator pedal position sensor;
   a park brake position sensor connected to the electrical system controller;
   an ignition switch position sensor connected to a vehicle ignition switch;
   a lift axle positioning system including pneumatic valves, solenoids for actuating the pneumatic valves and a solenoid controller coupled to the electrical system controller for generating solenoid control signals; and
   the electrical system controller being programmed to issue instructions to the lift axle means responsive to the values of the load sensors.

10. A wheeled vehicle as set forth in claim 9, further comprising:
   the electrical system controller being further programmed to respond to the primary air tank pressure sensor, the vehicle speed sensor, the transmission controller, the park brake position sensor, the accelerator pedal position sensor and the ignition switch position sensor.

11. A wheeled vehicle as set forth in claim 10, further comprising:
   the electrical system controller programming provides for filtering the load sensor signal to generate a load estimate.

12. A wheeled vehicle as set froth in claim 11, further comprising:
   the electrical system controller monitors primary air tank pressure to validate the load sensor signals.

13. A wheeled vehicle as set forth in claim 12, further comprising:
   indicators operably coupled to the electrical system controller and visible to the operator for generation of telltales; and
   the electrical system controller being programmed to provide to an operator distinct telltales using the indicators as to when the lift axle should be raised or lowered responsive to estimated vehicle weight.

14. A wheeled vehicle as set forth in claim 13, further comprising:
   the electrical system controller being programmed to automatically control the lift axle and suspension pressure dump responsive to the load signals indicating a weight in excess of a threshold weight and a speed signal indicating a greater than threshold speed.

15. A wheeled vehicle as set forth in claim 14, further comprising:
   switches allowing the operator to raise the lift axle when the vehicle's weight is below a threshold value and the vehicle's speed is less than 5 mph.

16. A wheeled vehicle as set forth in claim 15, further comprising:
   the electrical system controller programing providing for automatically lowering the lift axle if the vehicle speed is greater than or equal to 5 mph and the vehicle weight exceeds the threshold.

17. A wheeled vehicle as set forth in claim 16, further comprising:
   the electrical system controller providing for locking the operator from manually raising the axle when weight is above the threshold for as long as vehicle speed exceeds 5 mph.

18. A wheeled vehicle as set forth in claim 17, further comprising:
   the electrical system controller programming providing for automatically raising the lift axle responsive to setting of the park brake.

19. A wheeled vehicle as set forth in claim 18, further comprising:
   the electrical system controller including programming for automatically dumping the suspension if the lift axle is raised by the operator and the vehicle's weight is greater than the threshold value.

20. A wheeled vehicle as set forth in claim 19, further comprising:
   the electrical system controller including programming responsive to the lift axle being raised for allowing the operator to set the suspension from dump to ride height responsive to a wheel based vehicle speed error or out of range condition, with the speed at which a suspension dump being allowed not exceeding 5 mph.

* * * * *